United States Patent
Nijenkamp

(10) Patent No.: US 9,128,795 B2
(45) Date of Patent: Sep. 8, 2015

(54) METHOD AND SYSTEM FOR CHANGING SOFTWARE OR FIRMWARE ON AN ELECTRONIC DEVICE

(75) Inventor: Roy Nijenkamp, Borne (NL)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 13/518,812

(22) PCT Filed: Dec. 10, 2010

(86) PCT No.: PCT/EP2010/069429
§ 371 (c)(1),
(2), (4) Date: Jul. 27, 2012

(87) PCT Pub. No.: WO2011/076594
PCT Pub. Date: Jun. 30, 2011

(65) Prior Publication Data
US 2012/0311555 A1  Dec. 6, 2012

(30) Foreign Application Priority Data
Dec. 22, 2009 (EP) .................................. 09180488

(51) Int. Cl.
G06F 9/445 (2006.01)

(52) U.S. Cl.
CPC .............. G06F 8/65 (2013.01); G06F 9/44505 (2013.01)

(58) Field of Classification Search
None
See application file for complete search history.

(56) References Cited

U.S. PATENT DOCUMENTS

| | | | | |
|---|---|---|---|---|
| 5,974,312 A | * | 10/1999 | Hayes et al. | 455/419 |
| 6,177,860 B1 | * | 1/2001 | Cromer et al. | 340/10.1 |
| 6,378,069 B1 | * | 4/2002 | Sandler et al. | 713/153 |
| 7,753,281 B2 | * | 7/2010 | Li et al. | 235/492 |
| RE41,916 E | * | 11/2010 | Bates et al. | 340/10.1 |
| 8,543,839 B2 | * | 9/2013 | Sibert | 713/193 |
| 2003/0182414 A1 | * | 9/2003 | O'Neill | 709/223 |

(Continued)

FOREIGN PATENT DOCUMENTS

| | | | |
|---|---|---|---|
| EP | 2058975 A1 | * | 5/2009 |
| WO | 2005007258 A1 | | 1/2005 |
| WO | WO 2005007258 A1 | * | 1/2005 |

OTHER PUBLICATIONS

European Patent Office "International Search Report" mailed Mar. 31, 2011; International Appln. No. PCT/EP2010/069429, filed Dec. 10, 2010.

(Continued)

*Primary Examiner* — Isaac T Tecklu
(74) *Attorney, Agent, or Firm* — Ingrassia Fisher & Lorenz, P.C.

(57) ABSTRACT

Methods and systems are described for updating software or firmware or otherwise conveying target software to an electronic device. Target software may be conveyed while the device is packaged or otherwise not connected to external power. Information indicating a current software or firmware version number may be transmitted from an external transceiver to the packaged device. A software update may also be transmitted to the packaged device. The electronic device may use stored information or the stored software update to replace an older and out-of-date software version. The electronic device may also harvest electronic power from an external transceiver signal or may use power from an internal battery source to affect a software update when the device is packaged or otherwise not connected to external power.

15 Claims, 8 Drawing Sheets

(56) References Cited

U.S. PATENT DOCUMENTS

| | | | |
|---|---|---|---|
| 2004/0031030 A1* | 2/2004 | Kidder et al. | 717/172 |
| 2004/0237081 A1* | 11/2004 | Homiller | 717/170 |
| 2006/0002340 A1* | 1/2006 | Criss et al. | 370/328 |
| 2006/0229027 A1* | 10/2006 | Wang et al. | 455/73 |
| 2008/0040713 A1* | 2/2008 | Subbakrishna et al. | 717/173 |
| 2008/0127037 A1* | 5/2008 | Kadur et al. | 717/100 |
| 2008/0184151 A1* | 7/2008 | Agarwal et al. | 715/772 |
| 2009/0037899 A1* | 2/2009 | Dharap et al. | 717/173 |
| 2009/0187901 A1* | 7/2009 | Kanai | 717/173 |
| 2009/0224894 A1 | 9/2009 | Yang | |
| 2009/0260004 A1* | 10/2009 | Datta et al. | 717/175 |
| 2009/0265736 A1* | 10/2009 | Son | 725/37 |
| 2010/0070966 A1* | 3/2010 | Perng et al. | 717/173 |
| 2010/0079254 A1* | 4/2010 | Koo et al. | 340/10.3 |
| 2010/0087181 A1* | 4/2010 | Chen et al. | 455/418 |
| 2010/0191951 A1* | 7/2010 | Malone et al. | 713/2 |
| 2010/0242033 A1* | 9/2010 | Fritsch et al. | 717/171 |
| 2011/0010704 A1* | 1/2011 | Jeon et al. | 717/178 |
| 2011/0023023 A1* | 1/2011 | Chatterjee | 717/170 |
| 2011/0099545 A1* | 4/2011 | Lee et al. | 717/172 |
| 2011/0145809 A1* | 6/2011 | Hwang | 717/173 |
| 2011/0289497 A1* | 11/2011 | Kiaie et al. | 717/171 |
| 2012/0005497 A1* | 1/2012 | Tsukamoto et al. | 713/310 |
| 2012/0246631 A1* | 9/2012 | Chen et al. | 717/172 |
| 2013/0109323 A1* | 5/2013 | Ruutu et al. | 455/68 |
| 2013/0326495 A1* | 12/2013 | Reunamaki et al. | 717/173 |

OTHER PUBLICATIONS

European Patent Office, Extended Search Report, dated May 22, 2014 for European Patent Application No. 14164461.7.

* cited by examiner

METHOD AND SYSTEM FOR CHANGING SOFTWARE OR FIRMWARE ON AN ELECTRONIC DEVICE

CROSS-REFERENCES TO RELATED APPLICATIONS

This Application claims priority to International Application No. PCT/EP2010/069429 filed Dec. 10, 2010, which claims priority to European Application No. 09180488.0 filed Dec. 22, 2009.

TECHNICAL FIELD

The present invention relates to methods and systems for changing software on an electronic device, and more specifically to updating or loading software and/or firmware on an electronic device using a reflected power transceiver.

BACKGROUND

Increasingly short development times associated with software and/or firmware create particular difficulties for sellers and manufacturers of electronic devices. Specifically, the software needed to run an electronic device may go through several revisions. When a device is first assembled and packaged it may be loaded with a then-current version of a software package or firmware code. Once the device is purchased by a customer the software or firmware loaded on the device may be no longer current. The device may arrive at the customer (or arrive at the factory, warehouse, or retail shop) with an older or out-of-date software or firmware version because, while the device is packaged, it may not be practical to unpack the device, power-up the device and load a recent software version. Implementations discussed herein are directed to mitigating this problem by providing a method of updating software and/or firmware on a packaged device, or alternatively, writing information to the packaged device indicating that the device is required to perform a software or firmware update.

SUMMARY

Various embodiments seek to facilitate software updates and other software transfers to electronic devices. Embodiments discussed herein are directed to methods and systems for updating software or firmware of electronic devices while those devices are packaged or otherwise not connected to external power. One embodiment discussed herein transmits information from an external transceiver to the packaged electronic device which indicates a current software or firmware version number. Other implementations discussed herein transmit the software update itself to the packaged electronic device. When the electronic device is unpacked and connected to a power source the electronic device may use the received software version information to request a software or firmware update, or the electronic device may use the stored software update itself to replace an older and out of date software version existing on the electronic device. In other implementations, the software update may occur while the electronic device remains packaged. Specifically, the electronic device may harvest electronic power from the external transceiver signal or may use power from an internal battery source to update the software and/or firmware used by the electronic device.

According to a first aspect, there is provided a method of conveying a software change to an electronic product, the method comprising: sending an interrogation transmission from a transceiver to the electronic product, the electronic product being unconnected to an external power source; receiving a reply transmission from the electronic product, the electronic product harvesting power from the interrogation transmission for use in at least sending the reply transmission, the reply transmission including an identification for software currently installed on the electronic product; comparing the identification for the software currently installed on the electronic product to an identification for a target software version to determine if the electronic product requires a software change; and if the electronic product requires a software change, sending a software change transmission from the transceiver to the electronic product.

In one example, the electronic product is enclosed within a packaging.

In a further example, the packaging includes a marking visible on a surface of the packaging, the marking approximately indicating the location of a reflected power transceiver portion of the electronic product, and the operation of sending the interrogation transmission includes directing the transmission towards the marking visible on the surface of the packaging.

In a variation, the software change transmission includes an electronic key that operates to unlock a software component installed on the electronic product, the software component implementing a function that was unavailable before the software change transmission was received.

In another variation, the software change transmission includes the identification for a latest software version.

In another variation, the software change transmission includes an instruction to set a flag in a memory of the electronic product, the flag indicates that the software on the electronic product is out of date.

In another variation, the software change transmission includes software to be loaded onto the electronic product.

According to a second aspect of the present invention, there is provided a method of changing software on an electronic product, the method comprising: receiving an interrogation transmission from an external transceiver at the electronic product, the electronic product being unconnected to an external power source, the interrogation transmission being received at a reflected power transceiver portion of the electronic product; sending a reply transmission from the reflected power transmission transceiver, the reflected power transceiver harvesting power from the interrogation transmission for use in at least sending the reply transmission, the reply transmission including an identification for software currently installed on the electronic product; receiving a software change transmission by the reflected power transceiver from the external transceiver; and storing data from the software change transmission in a memory associated with the reflected power transceiver.

In one example, the method further comprises: harvesting power, by the reflected power transceiver, from the interrogation transmission for use in at least sending the reply transmission.

In another example, the method further comprises: providing power to the electronic product from the reflected power transceiver; and retrieving the identification for the software currently installed on the electronic product from a system memory of the electronic product.

In one example, the data from the software change transmission includes target software information and subsequent to the operation of storing the software update in the memory associated with the reflected power transceiver, the electronic product is connected to an external power source, and the method further comprises: retrieving the target software information from the memory associated with the reflected power transceiver by a processor of the electronic product; and sending a transmission across a network, the network transmission requesting the target software.

In a variation, the method further comprises: receiving the target software at the electronic product from a network transaction sent across the network.

In another variation, the method further comprises: receiving the target software at the electronic product from a satellite signal received at the electronic product.

In one example, the data from the software change transmission includes target software and subsequent to the operation of storing the target software in the memory associated with the reflected power transceiver, the electronic product is connected to an external power source, the method further comprising: retrieving the target software from the memory associated with the reflected power transceiver by a processor of the electronic product; and installing the target software in a system memory of the electronic product.

In another example, the data from the software change transmission includes target software, the method further comprising: providing power to the electronic product from the reflected power transceiver; and installing the target software in a system memory of the electronic product.

In one example, the power provided to the electronic product is harvested from an incident electromagnetic wave received at the reflected power transceiver.

In an alternative, the power provided to the electronic product is from a battery associated with the reflected power transceiver.

According to a third aspect of the present invention, there is provided a method of changing software on an electronic product, the method comprising: providing power to the electronic product; sending an interrogation transmission from the electronic product to a reflected power transceiver; receiving a software change transmission from the reflected power transmission transceiver, the reflected power transceiver harvesting power from the interrogation transmission for use in at least sending the software change transmission; and using data from the software change transmission to enable a software component on the electronic product.

In an example, the reflected power transceiver is a sticker that is affixed to a packing used to contain the electronic product, and the method further comprises: harvesting power, by the reflected power transceiver, from the interrogation transmission for use in at least sending the software change transmission.

In another example, the software component is installed on the electronic product in a locked condition, the software change transmission including an electronic key that is operable to unlock the software component.

Embodiments of the present invention will hereinafter be described by way example with reference to the accompanying drawings, in which:

DETAILED DESCRIPTION

Various embodiments discussed herein are directed to methods and systems for updating software or firmware of electronic devices while those devices are packaged or otherwise not connected to external power. One embodiment discussed herein transmits information, including a latest software or firmware version number, from an external transmitter or transceiver to the packaged electronic device. Other implementations discussed herein transmit the software update itself to the packaged electronic device. When the electronic device is unpacked and connected to a power source it may use the received software version information to request a software or firmware update, or the electronic device may use the stored software update itself to replace an older and out of date software version existing on the electronic device. In other implementations, the software update may occur while the electronic device remains packaged or otherwise unconnected to external power. Specifically, the electronic device may draw power from the external transceiver signal and/or may use power from an internal battery source to update the software and/or firmware used by the electronic device.

In addition to software updates, embodiments discussed herein may be used to transmit software to an electronic device that may be used by the electronic to implement certain features or functions of the device. The software that implements the features or functions may be transmitted to the electronic device when the device is packaged or otherwise not connected to external power. In other embodiments, the software that is used implement a feature or function may be already stored on the electronic device in a locked state that renders the software unusable. In this embodiment, a code or electronic key may be transmitted to the electronic device that may be used to unlock or otherwise enable the locked software. Once the software is unlocked, the features or functions that the software implements may become accessible.

Figure 1:
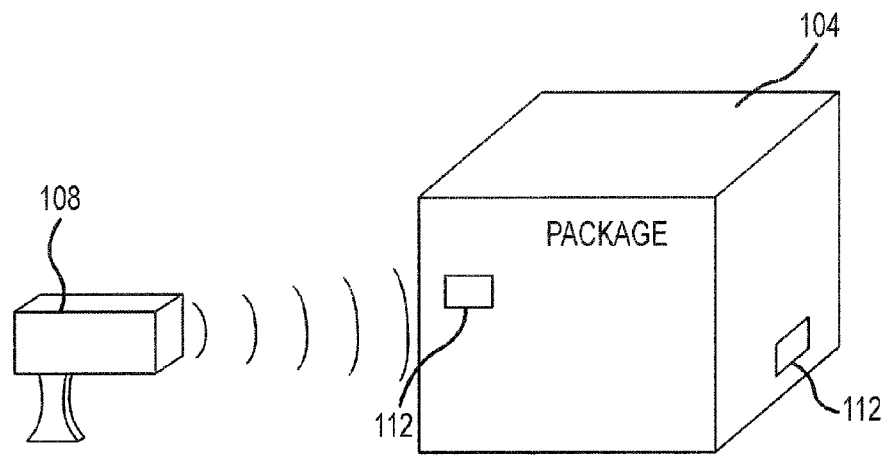
FIG. 1 is an illustration of an operating environment for components and features of implementations discussed herein.

FIG. 1 is an illustration of a package 104 that encloses one or more electronic devices. FIG. 1 additionally includes a transceiver 108 that may initiate wireless communication with the electronic device inside the package 104. The electronic device or devices within the package 104 may be arranged in an orientation such that transceivers internal to the electronic device are near a side of the package 104. In this position, the internal transceiver associated with the packaged electronic device may more conveniently communicate with external transceiver 108. The package 104 may include one or more stickers 112 or other visual indications on the surface of the package 104 that indicate the locations of the internal transceiver devices. The package 104 shown in FIG. 1 includes two stickers 112, indicating that the package 104 includes two internal devices which may communicate with the external transceiver 108. In alternative embodiments, a single sticker may indicate the presence of multiple internal devices capable of such communication.

Figure 2:
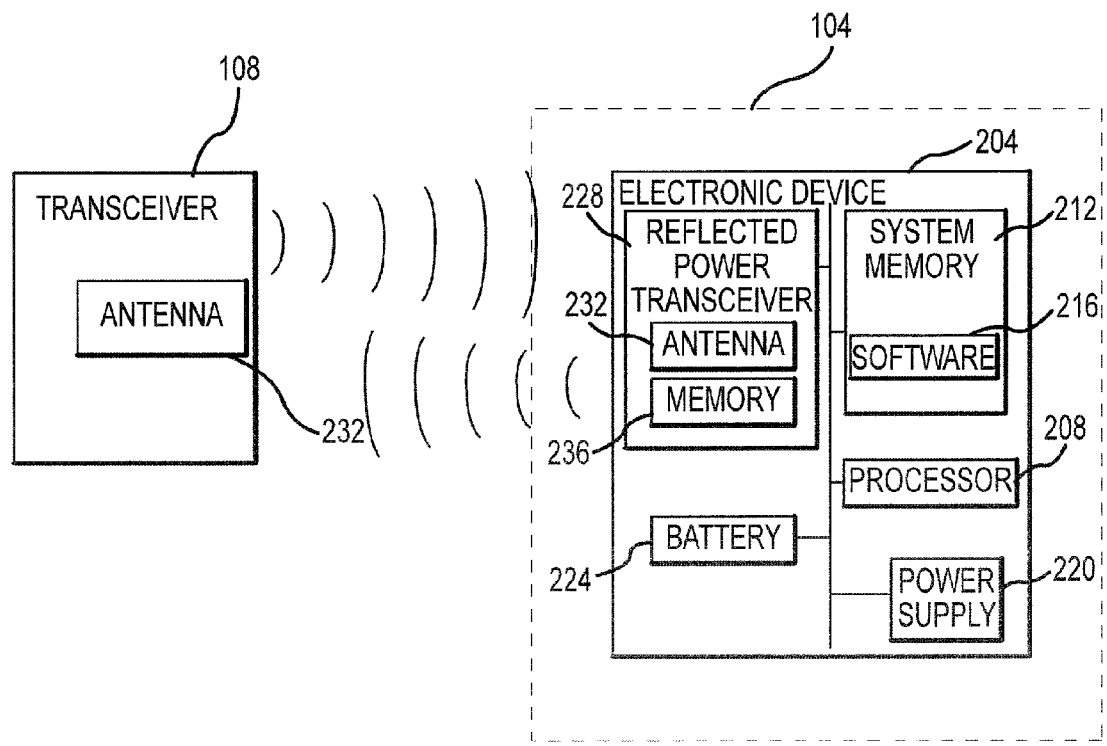
FIG. 2 is a schematic illustration of the system shown in FIG. 1.

FIG. 2 is a schematic illustration of an electronic device 204 that is enclosed by the package 104. Also shown in FIG. 2 is the external transceiver 108 in communication with the electronic device 204. The electronic device 204, as described herein, may be any type of electronic device that is packaged and sold to consumers or manufacturers. The electronic device may be, for example, a CD player, digital video recorder, cellular telephone, set-top box or other television receiver, computer, kitchen appliance, and so on. The electronic device 204 include may include a processor 208 in association with a memory 212. The system memory 212 generally stores one or more software modules 216, operating systems and/or firmware modules which execute on the processor 208 to control the operations of the electronic device 204. The electronic device 204 additionally includes a power supply 220. The power supply 220 typically powers the device 204 when the device is removed from the package 104 and used by the consumer or other person. Specifically, the power supply 220 may transform power from an AC power source to a type suitable for internal use by the electronic device 204. While the electronic device 204 is in the package 104, the power supply 220 may not be available to power the device 204.

With the electronic device 204 in the package 104, the power supply 220 is not available to power communications with the transceiver 108. Instead, power for communication with the transceiver 108 may come from the received signal itself or from an internal battery 224. In this regard, the electronic device 204 includes a reflected power transceiver 228. The reflected power transceiver 228 is in communication with the transceiver 108 while the electronic device 204 is inside the package 104. The reflected power transceiver 228 may operate, in part, by harvesting power associated with signals received from the transceiver 108. The reflected power transceiver 228 may be a radio frequency identification (RFID) device or similar technology.

Operating on the principles associated with this type of technology, the reflected power transceiver 228 may harvest power from an incident electromagnetic wave and convert that power into internal electronic currents to power the operation of the reflected power transceiver 228 and/or other components of the electronic device 204. Specifically, the magnetic and/or electric components of an incident electromagnetic wave may be converted into currents which are usable to provide power. As one example, the transceiver may operate using principles similar to those of inductive charging.

In using this harvested power, the internal transceiver 228 may transmit signals back to the external transceiver 108. In certain embodiments, the harvested power may be used to "wake up" the reflected power (e.g., internal) transceiver 228, at which point the power for the reflected power transceiver may come from the transceiver battery 224. In certain embodiments, the reflected power transceiver 228 may use power from the battery 224 or harvested from the incident electromagnetic wave to power other parts of the electronic device 204. In this way, the reflected power transceiver may access, or otherwise power, the processor 208 or the system memory 212.

The reflected power transceiver may include an antenna 232 and a memory 236. The antenna 232 may be used to receive and transmit wireless signals to and from the external transceiver 108. The memory 236 may be used to store information or data received from the transceiver 108. The data received from the external transceiver 108 may include information regarding recent software updates. In certain embodiments, the memory 236 may be used to receive and store software updates to be installed by the electronic device 204. The ability of the electronic device 204 to receive software updates while packaged or otherwise without power may depend on the power and bandwidth requirements to transfer data. As one example, certain larger or more complex devices may require larger data transfers to affect a software update. In certain cases, it may be more practical to provide an indication to the electronic device 204 that its software is out of date and requires an update instead of transmitting the entire update. For other devices it may be practical to transfer the actual software update from the transceiver 108 to the electronic device 204 while the device is packaged.

Figure 3:
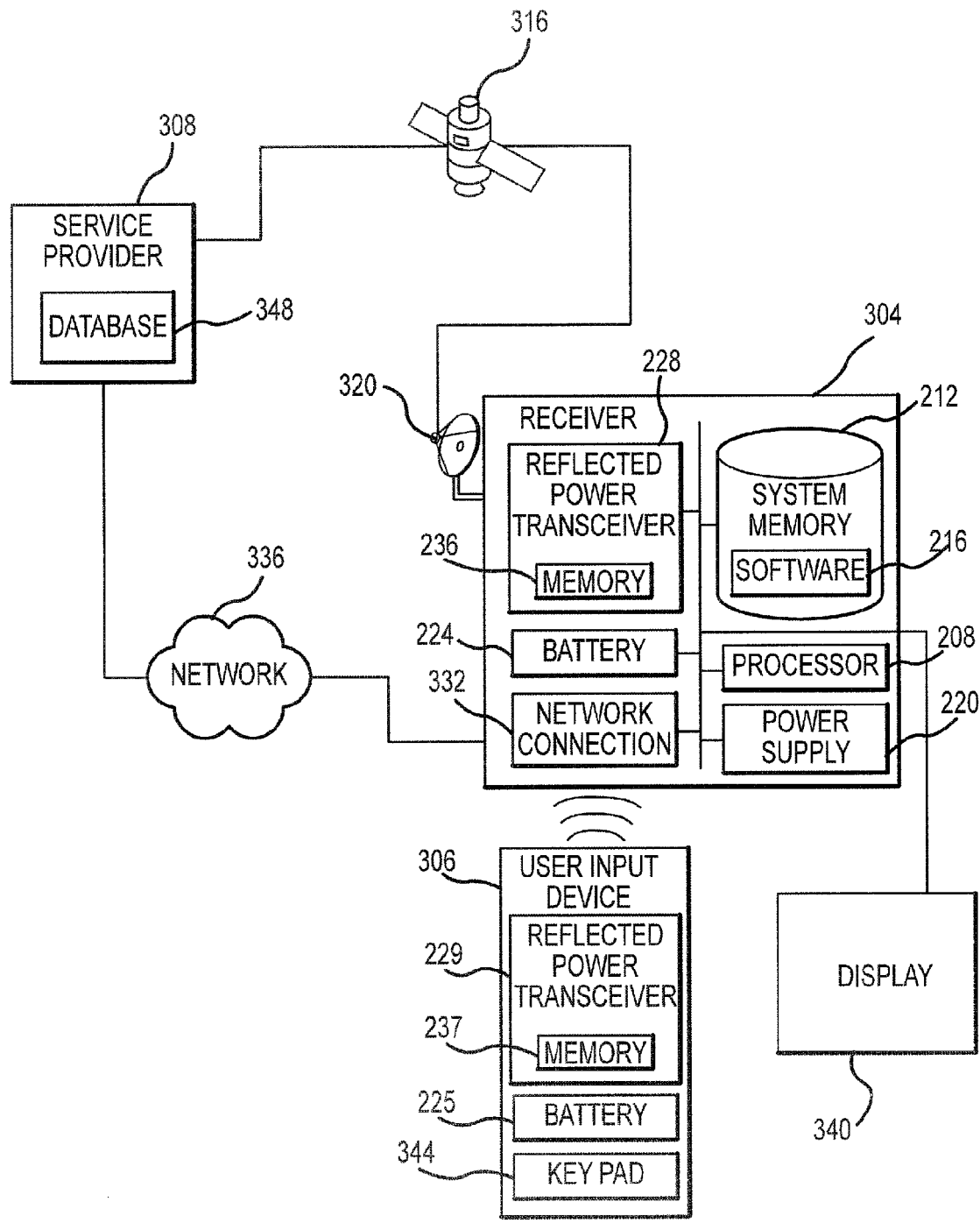
FIG. 3 is a schematic illustration of a system incorporating features of embodiments discussed herein.

FIG. 3 is a schematic illustration of a number of devices which may incorporate the implementations discussed herein. FIG. 3 includes a receiver 304 which is controlled by a wireless remote 306. The wireless remote 306 may communicate with receiver 304 using infrared (IR), radio frequency (RF) or other appropriate communication channel. As used herein, a "receiver" may be any device capable of receiving video content included in a broadcast or other program service transmission from a service provider. For example, a receiver may include a set-top box, a cable box, general purpose computer, and so on. A receiver may also include a cable modem or other device that receives streaming video. As used herein, a "service provider" may include any entity that provides a program service transmission to a receiver such as, without limitation, a satellite television provider, an over-the-air television provider, a cable television provider, and so on. It should be understood that the term "program service transmission" generally embraces not only satellite or terrestrial broadcasts and/or narrowcasts but also transmission of information across any wired or wireless transmission medium. Accordingly, a "program service transmission" encompasses transmission of information across a cable network (for example from a cable headend to cable receiver), an Internet or other computer-accessible medium (including a local area network, wide-area network, and so on), including Internet protocol television transmissions, a wireless network such as a radio frequency or infrared network, and so on.

FIG. 3 is a schematic illustration of a general operating environment showing certain components of the receiver 304. FIG. 3 also shows a service provider 308 that transmits or otherwise provides a program service transmission to the receiver 304. The receiver 108 may be associated with or located near an individual, business or other entity, user or subscriber that receives a program service transmission from the service provider 308. The program service transmission may be received through a subscription to the service. Insofar as the general operations of receivers are known to those skilled in the art, they will not be discussed herein and certain components used for such operations may be omitted from the figures and description.

Generally the terms "user" and/or "subscriber" refer to an individual or company who receives a program service transmission. This may include those who have purchased a subscription to the program service transmission. Additionally, the terms "user" and/or "subscriber" may refer to individuals who have been given access to the program service transmission through promotional offers and/or other non-fee-based agreements.

The receiver 304 and user input device 306 may each include a reflected power transceiver 228. As described above in connection with FIG. 2, a reflected power transceiver 228, 229 may be used to receive software updates or software update information. For the receiver 304, the reflected power transceiver 228 may be used to receive software updates or information when the receiver is not connected to a external power source. For the user input device 306, the reflected power transceiver 229 may be used to receive software updates or information when the user input device is not otherwise connected to its normal power source. The user input device 306 may likewise include a memory 237 and battery 225, which generally perform functions similar to those of the receiver's memory 236 and battery 224.

Although a satellite system 316 is provided as an example of a program service transmission system, it should be understood that other networks or broadcasts for transmitting data may be used by alternative embodiments. For example, embodiments may be implemented in connection with a cable service. In this case, the service provider 308 and the receiver 304 may communicate over a communication path that includes various combinations of local and wide area networks and/or the Internet. In such embodiments, the receiver 304 may be configured to access a web site, a file transfer protocol (FTP) site, a file sharing system or site, and so on.

The receiver 304 may include or be associated with a memory or other storage device 212, such as magnetic or optical storage. The storage device 212 may be operable to store data received from the decoded satellite signal. The storage device 212 may be volatile or non-volatile memory implemented using any suitable technique or technology such as, for example, random access memory (RAM), disk storage, flash memory, solid state and so on. The storage device 212 may be located within the receiver 304 or separately from the receiver 304. The storage device may removable in nature. The stored data set may include audio and/or visual content transmitted by an A/V processing module 338 to the display 340. In addition to these functions, the storage device 212 may be used to store software 216, firmware, or other processor executable code useable to perform the various operations of the receiver. The software 216 may be initially installed when the receiver 304 is assembled and packaged. If subsequent versions to the software 216 become available while the receiver is packaged or otherwise disconnected from external power, software updates or software update information may be received through the operation of the reflected power transceiver 228. In some embodiments, the reflected power transceiver 228 may install a software update by supplying power to the storage device 212 and replacing all or a portion of the existing software 216. In other embodiments, a software update may be affected when external power is supplied to the receiver. In response to an interrogation signal from an external transceiver 108, the reflected power transceiver 228 may additionally supply power to the storage device 212 to discover a software 216 version identification number.

The receiver 304 may additionally include a processor 208 operable to run executable code in connection with various functions associated with the receiver 308. For example, the processor 208 may facilitate display of graphics, images, animations or other content on a display 340, such as a television or monitor. The processor 208 may be further operable to recall and display stored content, such as a purchased or recorded videos or programs. In connection with software updates, the processor 208 may be operable to retrieve data from the memory 236 associated with the reflected power transceiver 228. In some embodiments, the processor 208 may retrieve software update information, such as the latest software version number, from the memory 236. This retrieved information may then be used to facilitate a software update. In other embodiments, the processor 208 may retrieve the software update itself and install the software update in system memory 212, as appropriate. As software updates or software update information may be written to the memory 236 when the receiver 304 is disconnected from external power, the processor 208 may be programmed to check the memory 236 when the receiver is initially powered-up. Certain embodiments may combine the system memory 212 and memory 236.

One particular example of a receiver 304 may include a network interface 332. The network interface 332 may be operable to communicate or send information across a network 336. In accordance with certain embodiments discussed herein, the network interface 332 may take the form of a modem network interface card, cable plug or jack, and so on. Using the interface, the receiver may communicate over a network 336 such as the public switched telephone network (PSTN). However, it should be appreciated that the network 336 may be any type of network capable of data communication, such as, for example, a local or wide area network or the Internet. The receiver 304 may communicate through the network interface 332 using any suitable communication protocol such as TCP/IP. Through the network interface 332, the receiver 304 may submit a request for a software update based on software update information received by the reflected power transceiver 228. In alternative embodiments, the receiver 304 may communicate with the service provider 308 through the satellite system 316. The request may be processed by service provider 308 accessing a database 348 of the latest software. In some embodiments, the service provider 308 may transmit the software update across the network 336. In other embodiments, the service provider may transmit the software update via the satellite 316.

FIGS. 4-7 are flow charts that illustrate methods of providing software and/or software information to an electronic device that affects a change of the software installed on the electronic device. FIG. 4-7 are discussed in the context of providing a target software and/or firmware. As used herein, "target software" may include software and/or firmware updates or software that implements a previously unavailable feature or function. In certain embodiments, the target software itself is transmitted to the electronic device. In other embodiments, identifying information is sent to the electronic device that enables the device to acquire the target software. The target software may also be installed on the electronic device in a locked stated. In this embodiment, an electronic key may be sent to device that unlocks the target software.

In the following discussions of FIGS. 4-7, software change embodiments will be discussed in connection the receiver 304 shown in FIG. 3. It should be appreciated that the methods described also apply to other device that incorporate components and features described herein. Moreover, it should be appreciated that the following discussions of FIGS. 4-7 variously refer to the receiver 304 in a packaged condition (as shown in FIG. 1) and in an operating condition (as shown in FIG. 3). It should be appreciated that references to software in FIGS. 4-7 may be read to include firmware, as well.

Figure 4:
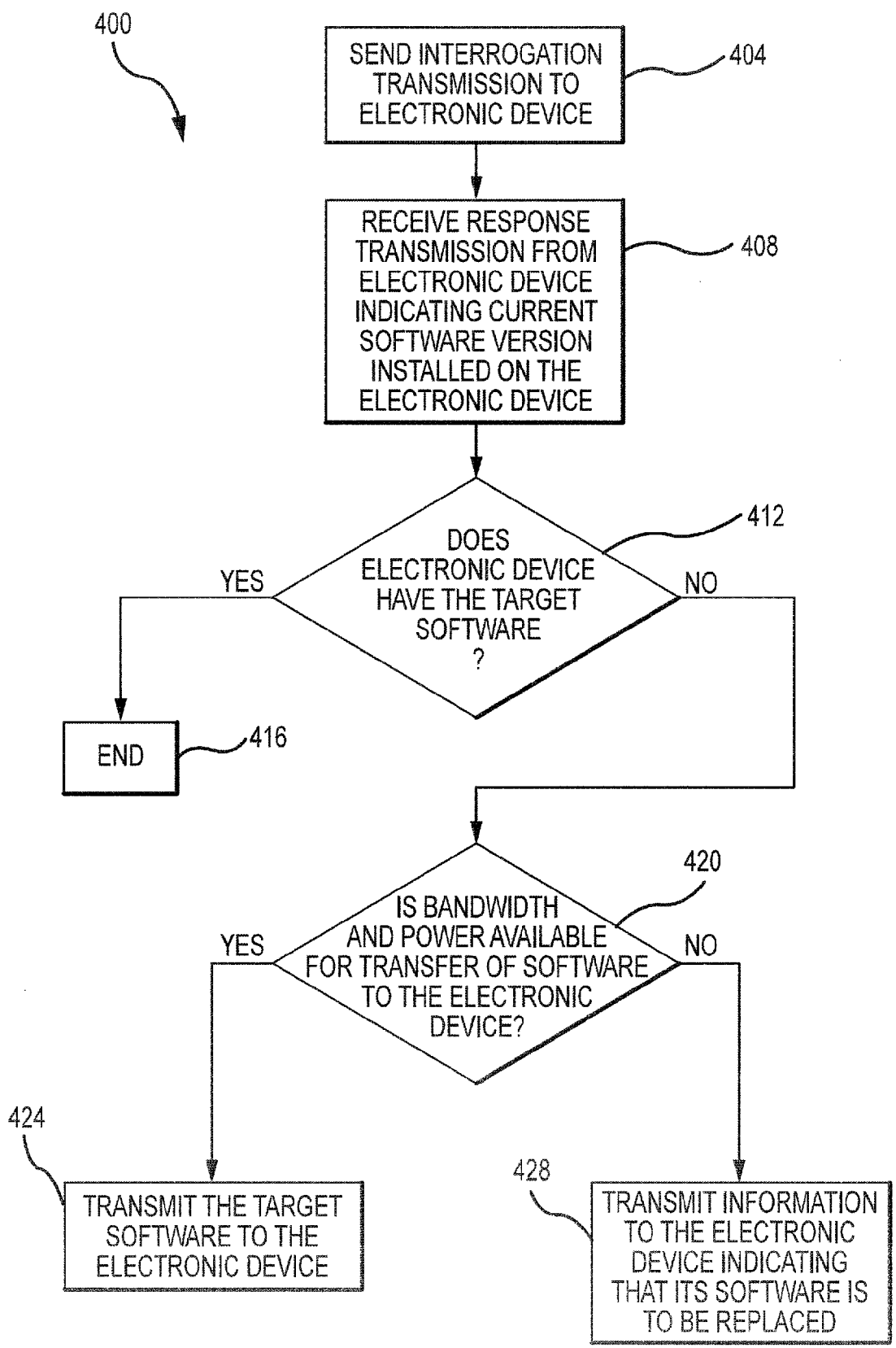
FIG. 4 is a flow chart illustrating a method of conveying a software update or software update information in accordance with implementations discussed herein.

FIG. 4 is an illustration of a method of sending information or updates to the stored packaged electronic device 304. The flow chart 400 illustrates a method of transmitting a software change or software change information to a packaged electronic device. Initially, at step 404, an interrogation signal is sent from a transceiver 108 to a packaged device 304. Following operation 404, operation 408 may be executed.

In operation 408, a signal is received at the transceiver 108 from the packaged electronic device 304. The signal received in operation 408 is sent by the packaged electronic device 304 in response to the interrogation signal sent in operation 404. The signal sent from the electronic device 304 includes information regarding a current software or firmware version installed on the electronic device 304. Following operation 408, operation 412 may be executed.

In operation 412, a determination is made regarding whether the packaged electronic device 304 has the target software or firmware intended to be installed on the device 304. If it is determined in operation 412 that the packaged electronic device 304 has the target software or firmware, the method may end at operation 416. Alternatively, it is determined in operation 412 that the packaged electronic device 304 does not contain the target software or firmware, operation 420 may be executed.

In operation 420, a determination is made regarding whether bandwidth and/or power considerations permit the transfer of the target software and/or firmware from the transceiver 108 to the packaged electronic device 304. If, in operation 420, it is determined that bandwidth and power considerations permit a software transfer, operation 424 may be executed. In operation 424, the target software and/or firmware is transmitted by wireless signal from the transceiver 108 to the packaged device 304. If, in operation 420, it is determined that bandwidth and power considerations prohibit transfer of the target software and/or firmware, operation 428 may be executed.

In operation 428, the transceiver 108 sends identifying information to the electronic device 304 such as a software and/or firmware version number. The software and/or firmware version number may be stored by the electronic device 304 and later used to acquire the target software or firmware when the device is powered-up. Alternatively, the transceiver 108 may set a flag in the electronic device 304 indicating that a software update is required. In other embodiments, operation 428 may include transmitting an electronic key to the device 304 that may be used to unlock certain locked software components.

The operations of FIG. 4 are generally executed by the transceiver 108. However, certain operations may be omitted (such as operations 404 and 408) and other operations performed by the receiver (such as operations 412 and 420) in alternative embodiments.

Figure 5:
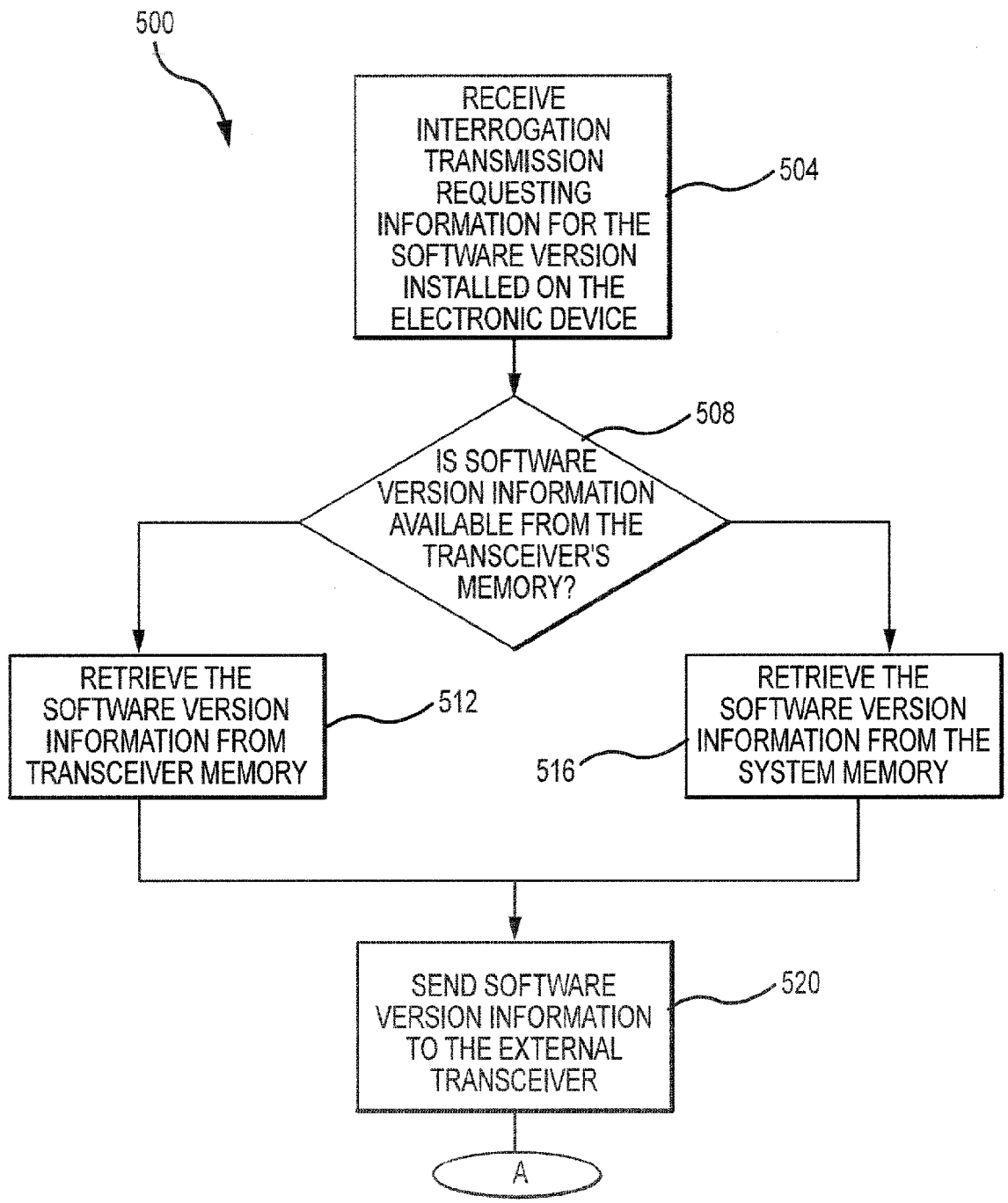
FIG. 5 is a flow chart illustrating a method of responding to a software update interrogation transmission in accordance with implementations discussed herein.

FIG. 5 is a flow chart 500 showing operations in a method in accordance with implementations discussed herein. FIG. 5 illustrates a method of receiving target software or target software information. Initially, at operation 504, a packaged electronic device 304 receives an interrogation signal from an external transceiver 108. The interrogation signal received in operation 504 requests information regarding a version number or other identifying information for software or firmware installed on the electronic device 304. In response to operation 504, operation 508 may be executed.

In operation 508, the reflected power transceiver 208 determines if the software version or other identifying number is available in the transceiver memory 236. If the software or firmware version number or identification is available from the transceiver memory 236, it is retrieved therefrom in operation 512. If the software or firmware version number is not available in the transceiver memory 236, the reflected power transceiver may retrieve the software or firmware version number from the system memory 212, in operation 516.

Retrieving software or firmware version identification data requires consumption of power which may not be available through the power supply 220 when the electronic device 304 is inside the packaging 104. Consequently, the reflected power transceiver 228 may use alternative sources of power to retrieve the relevant data. In some embodiments, the reflected power transceiver 228 harvests electromagnetic power from the incident electromagnetic wave which carries wireless signals from the external transceiver 108. In other embodiments, the reflected power transceiver 228 draws power from an associated transceiver battery 224. As can be appreciated, retrieving data from the reflected power transceiver memory 236 may consume less power than retrieving the same data from system memory 212. Accordingly, in order to facilitate efficient communication with the transceiver 108, the electronic device 304 may store software or firmware version information in the transceiver memory 236 when the software is installed.

Figure 6:
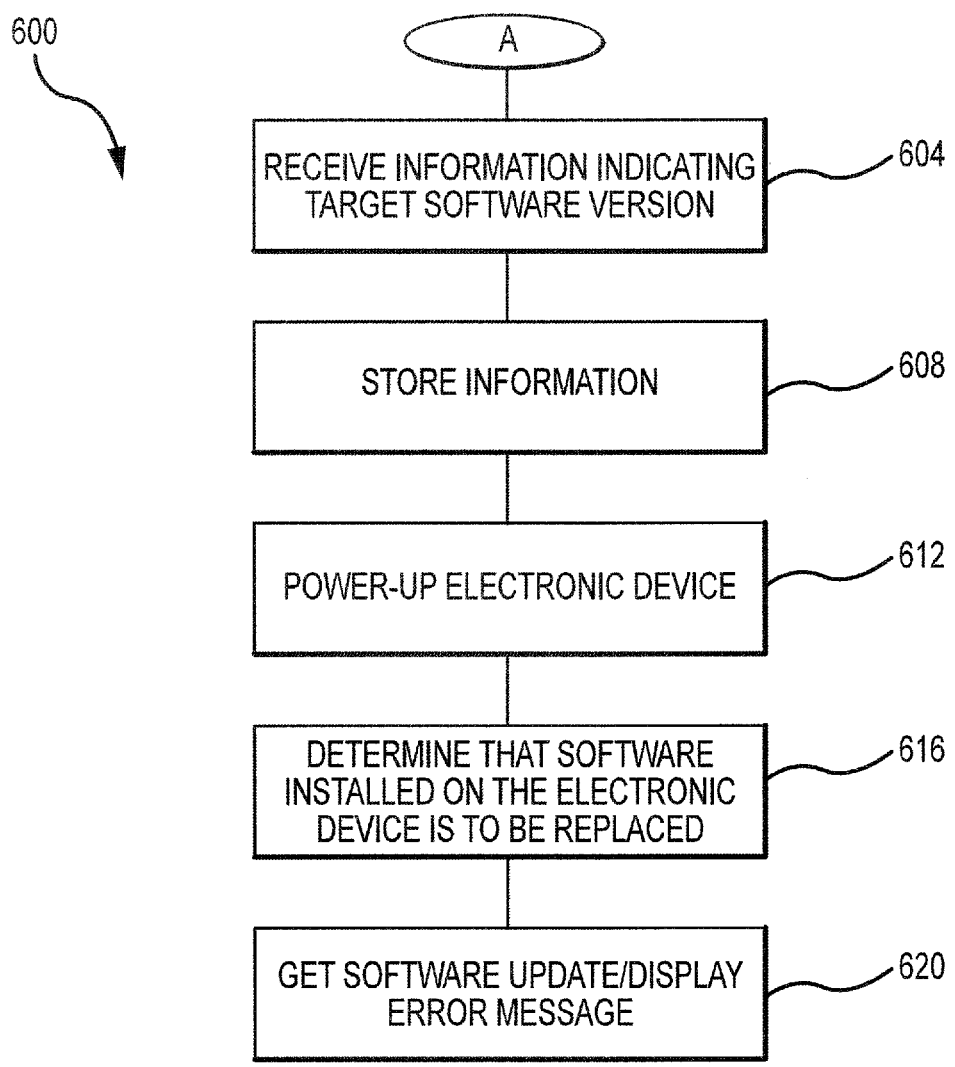
FIG. 6 is a flow chart illustrating a method of receiving software update information in accordance with implementations discussed herein.
Figure 7:
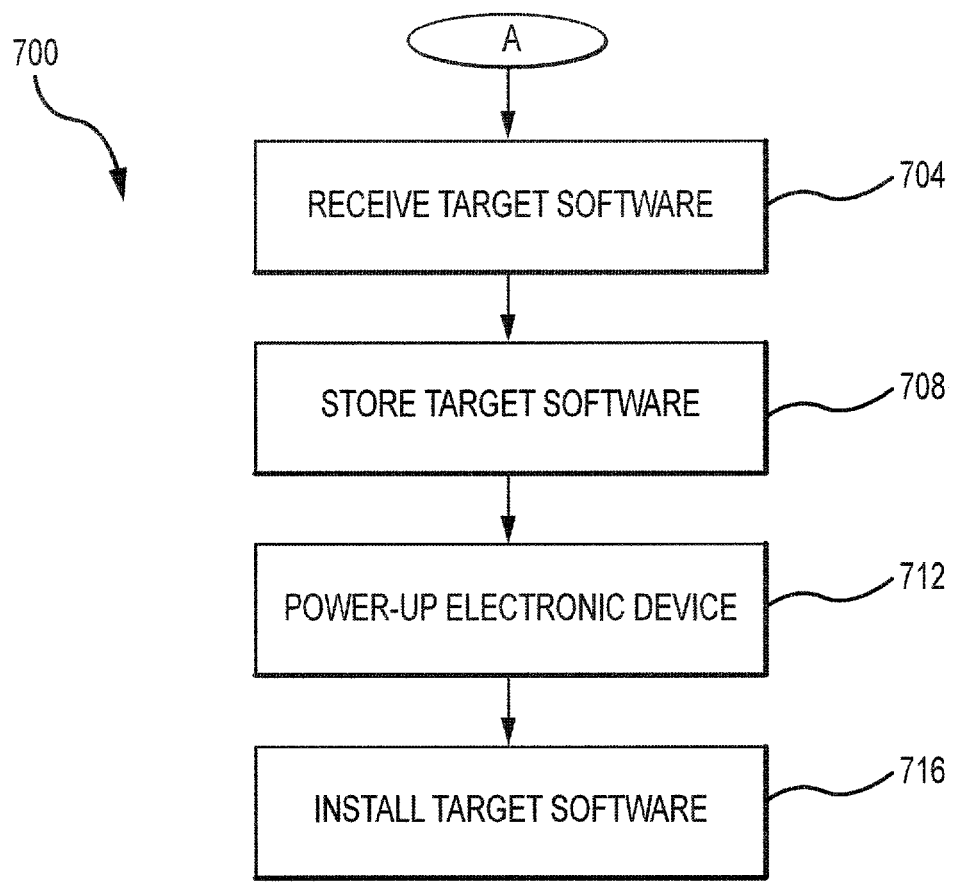
FIG. 7 is a flow chart illustrating a method of receiving a software update in accordance with implementations discussed herein.

Following either operation 512 or 516, operation 520 may be executed. In operation 520, the reflected power transceiver 228 may send the target software or firmware version information to the transceiver 108. As described above in connection with FIG. 4, the transceiver 108 or systems associated therewith may determine if a software change is required for the device 304. Based on this determination and based on power and bandwidth considerations, the transceiver 108 may either send the target software itself or identifying information associated with the target software or firmware. FIG. 6 illustrates an embodiment in which information regarding software changes is received by the packaged electronic device 304. FIG. 7 illustrates a method of receiving the target software itself.

FIG. 6 is a flow chart 600 illustrating the method of receiving software or firmware change information at a packaged electronic device 304. Initially, at step 604, the packaged electronic device 304 receives information from the transceiver 108. The information received at the electronic device 304 may include a version number or identification for a target software. In some embodiments, the information received at the electronic device 304 may include a flag or bit that is set to indicate that a software update is required. Following operation 604, operation 608 may be executed.

In operation 608, the information received in operation 604 may be stored. Specifically, the reflected power transceiver 228 may use power harvested from the incident wireless signal or from the associated transceiver battery 224 to affect a storage of the received information. The received information may remain in the transceiver memory 236 while the packaged electronic device is shipped or otherwise conveyed to an end user. Following this, operation 612 may be executed.

In operation 612, the electronic device 304 may be removed from its packaging 104 and connected to AC power or other external power source. The power supply 220 may supply power to the electronic device 304 wherein the device 304 may operate normally. Following operation 612, operation 616 may be executed. In operation 616, the processor 208 may read the stored software or firmware information from the transceiver memory. In so doing, the processor 208 may determine that its current software or firmware is out of date or otherwise to be changed. In response to operation 616, operation 620 may be executed.

In operation 620, the device 304 may acquire the target software and/or firmware. For certain devices which include a network connection, such as the set-top box or receiver shown in FIG. 3, operation 620 may include transmitting a network query to a service provider 308 which instructs the service provider to transmit the required target software. This may include sending the target software across the network, or in connection with satellite receivers, the target software may be sent from an uplink center 312 through a satellite to be received by a tuner. In other embodiments, operation 620 may include displaying error messages or other communications to an end user that signifies the need for the target software.

FIG. 7 is a flow chart 700 illustrating operations of a method in accordance with implementations discussed herein. FIG. 7 illustrates operation of receiving target software at a packaged electronic device 304. Initially, at step 704, the data is received at the packaged device 304. The received data signal includes the target software version transmitted from the transceiver 108. In response to operation 704, operation 708 may be executed. In operation 708, the target software or firmware version may be stored. Here, the software may be stored in the transceiver memory. Following operation 708, operation 712 may be executed.

In operation 712, power may be supplied to the device 304. In one embodiment, this may include supplying power harvested from the incident electronic wave or from the transceiver battery. If such power sources are not available or sufficient to effect a required power up of the system, operation 712 may occur when the device is removed from its packaging and connected to AC power through a power supply. Following operation 712, operation 716 may be executed. In operation 716, the target software and/or firmware is installed on the device 304.

The methods of installing software or transmitting information regarding software described above include an initial step of sending an interrogation signal from a transceiver 108 to a packaged electronic device 304. It should be appreciated that other embodiments do not necessarily include this interrogation signal. As an alternative, an initial signal may be sent which transmits information indicating a target software or firmware version from the transceiver 108 to the packaged electronic device 304. In response to receiving this, the packaged electronic device 304 may take a number of actions. Specifically, the reflected power transceiver may compare the received identification number to an internal identification number which identifies the software or firmware version available on the electronic device 304. If it is determined that the software or firmware version available on the device 304 is out of date or otherwise differs from the target software, a signal may be sent to the transceiver through the reflected power transceiver 304. The signal may indicate that the transceiver 304 should transfer the target software, if possible. In other embodiments, the target software and/or firmware version information is stored for later use when the device 304 is removed from its packaging and connected to AC power.

The methods described above are applicable to providing software or an electronic key to unlock software that implements a previously unavailable feature or function. In these embodiments, a vendor may ship the electronic device 304 with certain customized features. For example, a customer may have purchased the device 304 and paid a higher fee in order to have a certain premium features. Software that implements these premium features may be loaded onto the device as described above. Alternatively, the feature may be incorporated into the device 304 in a locked state. Here, an electronic key that unlocks the feature may be loaded onto the device using the methods described above. In addition to these premium features, the methods described above may be used to load or enable certain regional settings. For example, if the shipping destination of the device 304 is known, certain appropriate language or other regional features may be loaded or unlocked.

Figure 8:
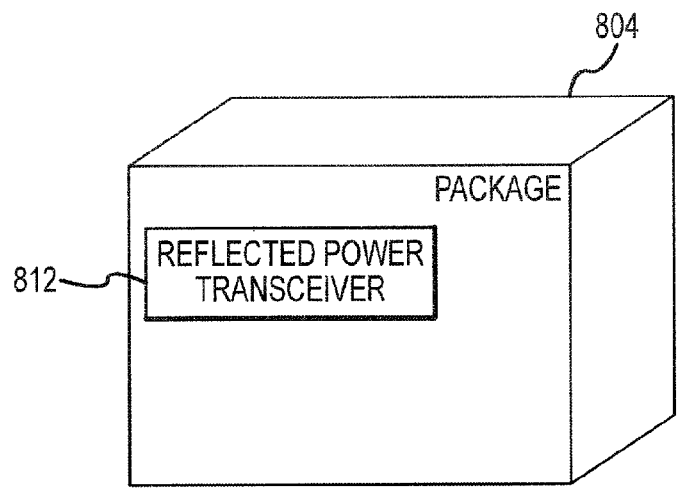
FIG. 8 is another illustration of an operating environment for components and features of implementations discussed herein.
Figure 9:
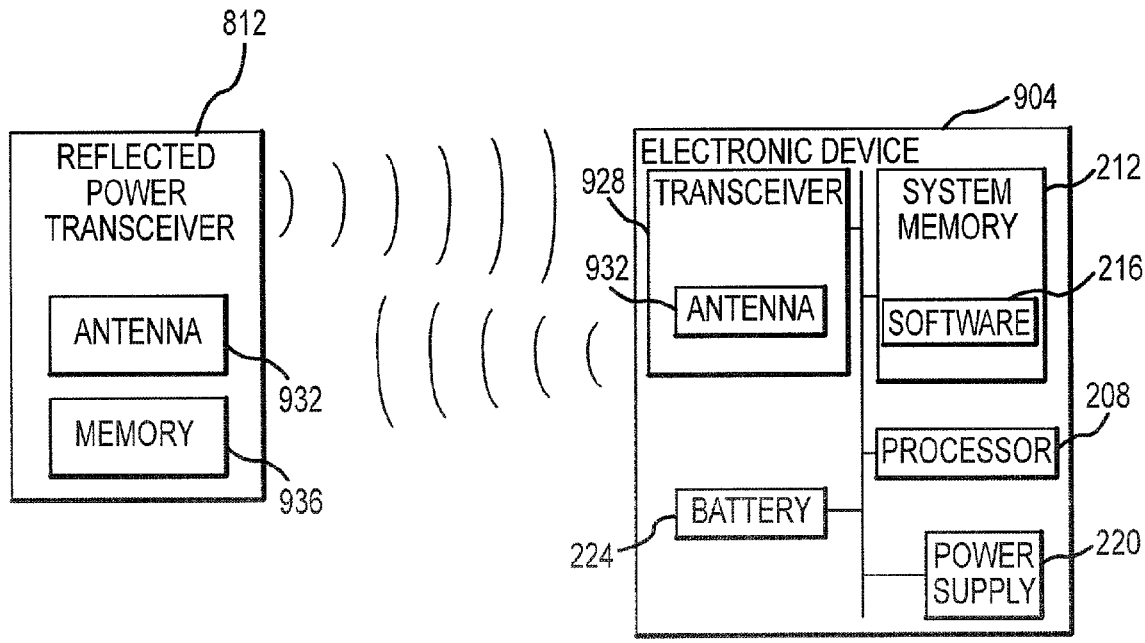
FIG. 9 is a schematic illustration of the system shown in FIG. 8.

As described above, certain embodiments feature a reflected power transceiver that is incorporated in an electronic device and that communicates with an external transceiver using power harvested from an incident electro-magnetic wave. As shown in FIG. 8 and FIG. 9, other embodiments feature a transceiver incorporated in an electronic device and an external reflected power transceiver.

FIG. 8 is an illustration of a package 804 that encloses one or more electronic devices. The package 804 may include one or more stickers 812. In this embodiment, the sticker 812 includes a reflected power transceiver 812 that is operable to transmit software to the electronic device, when the electronic device is unpackaged and connected to external power. The reflected power transceiver 812 may store and transmit a software and/or firmware update. Also, reflected power transceiver may store and transmit software or an electronic key to unlock software that implements a previously unavailable feature or function.

FIG. 9 is a schematic illustration of an electronic device 904 that is enclosed by the package 104. In FIG. 9, the electronic device 904 is removed form the package 804 and connected to external power. In this way, power is provided to internal components including a transceiver 928. The transceiver 928 is operable to communicate with the external reflected power transceiver 812 (sticker), provided that the reflected power transceiver is in range of the internal transceiver 928. The reflected power transceiver 812 may operate by harvesting power associated with signals received from the internal transceiver 928. The reflected power transceiver 812 may be a radio frequency identification (RFID) device or similar technology. Accordingly, once the electronic device 904 is connected to external power, software or software information may be loaded onto the electronic device from the reflected power transceiver 812.

By providing software through a reflected power transceiver 812 that is affixed to packaging 804 as a sticker, an electronic device 904 may be conveniently shipped to a customer, manufacturer, or other destination with a desired software version. Instead of opening the package, loading a desired software version and repackaging the electronic device 904, the vendor may affix the reflected power transceiver 812 to the outside of the package 804. In this way, the electronic device 904 may ship with the latest software or firmware update. Additionally or in combination, the electronic device 904 may ship with software or an electronic key to unlock software that implements a previously unavailable feature or function.

The electronic device 904, as described herein, may be any type of electronic device that is packaged and sold to consumers or manufacturers. The electronic device may be, for example, a CD player, digital video recorder, cellular telephone, set-top box or other television receiver, computer, kitchen appliance, and so on. The electronic device 904 include may include a processor 208 in association with a memory 212. The system memory 212 generally stores one or more software modules 216, operating systems and/or firmware modules which execute on the processor 208 to control the operations of the electronic device 904. The processor 208 may be operable to load software received from the internal transceiver 928 and install the received software in the system memory 212. Also, the processor 208 may be operable to load an electronic key received from the internal transceiver 928 and use the electronic key to unlock previously unavailable software stored in the memory 212.

As described above, software or software keys may be loaded on reflected power transceiver 812 that is provided as a sticker on package 804. In other embodiments, the reflected power transceiver 812 may be provided on a card or other similar instrument that may be purchased at a retail shop or otherwise delivered to a customer or other user or seller of the electronic device 904. Once acquired, the reflected power transceiver 812 may be used as described above to transmit software to the electronic device 904.

Figure 10:
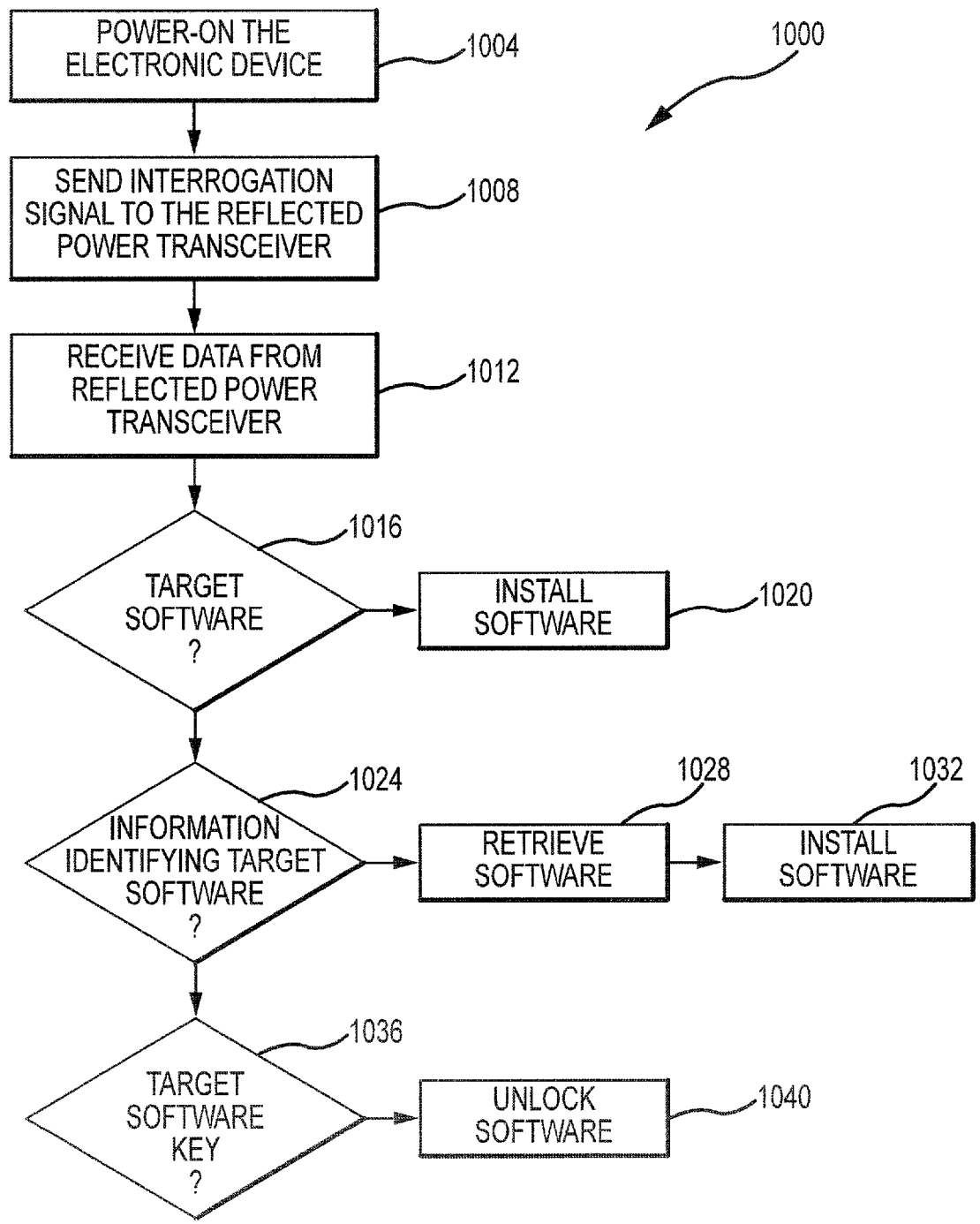
FIG. 10 is another flow chart illustrating a method of conveying a software update or software update information in accordance with implementations discussed herein.

FIG. 10 is an illustration of a method of receiving target software or target software information at an electronic device 804. FIG. 10 includes a flow chart 100 that will be described with reference to FIG. 8 and FIG. 9. Initially, at operation 1004, power is provided to the electronic device 804. Operation 1004 may include removing the electronic device 804 from its packaging and connecting it to AC power. Following operation 1004, operation 1008 may be executed. In operation 1008, the electronic device 804 sends an interrogation signal to a reflected power transceiver 812, which may be affixed to packaging used for the electronic device 804. Following operation 1008, the electronic device 804 receives a reply transmission from the reflected power transmitter 812, in operation 1012. The reflected power transceiver 812 may harvest power from a signal sent by a transceiver 928 component of the device 804.

In response to receiving the reply transmission, the electronic device 804 may take a number of actions depending on the content of the transmission. If, in operation 1016, the electronic device 804 determines that the reply transmission contains target software, the target software may be installed on the electronic device 804, in operation 1020. If, in operation 1024, the electronic device 804 determines that the reply transmission contains target software identifying information, the electronic device 804 may use the identifying information to retrieve the software, in operation 1028. This may include issuing one or more network transactions as described above. Once the software is retrieved, it may be installed on the electronic device 804, in operation 1032. If, in operation 1036, the electronic device 804 determines that the reply transmission contains an electronic key, the electronic device 804 may use the electronic key to unlock software on the device 804, in operation 1040. In this way, one or more previously unavailable functions or features may become accessible.

While embodiments are discussed herein in connection with the exemplary satellite broadcast system shown in FIG. 3, it should be appreciated that embodiments may be used in connection other types of networks or content delivery mechanisms. Generally, the receivers discussed herein include content delivered from a provider to a receiver across or over a network. The network across which content may be delivered may include satellite system, such as the one shown in FIG. 3. Alternatively, the network may include a cable television network, local area network, wide area network or the Internet. In connection with certain embodiments, a receiver may include a general purpose computer operable to receive data or other content across a network, such as a wide area network of the internet. In such embodiments, the computer may be configured so that a provider can be a web site, a file transfer protocol (FTP) site, a file sharing system or site, and so on.

The invention claimed is:

1. A method of conveying a software change to an electronic product having a memory, the method comprising:
    sending an interrogation transmission from a transceiver to the electronic product, the electronic product being unconnected to an external power source;
    receiving a reply transmission from the electronic product, the electronic product harvesting power from the interrogation transmission for use in at least sending the reply transmission, the reply transmission including an identification for software currently installed on the electronic product;
    comparing the identification for the software currently installed on the electronic product to an identification for a target software version to determine if the electronic product requires a software change; and
    if the electronic product requires a software change, then sending a software change transmission from the transceiver to the electronic product, wherein the software change transmission sets a flag in the memory of the electronic product, the flag indicating that the software on the electronic product is out of date;
    wherein the electronic product is enclosed within a packaging that includes a marking visible on a surface of the packaging, the marking approximately indicating the location of a reflected power transceiver portion of the electronic product, and the operation of sending the interrogation transmission includes directing the transmission towards the marking visible on the surface of the packaging.

2. A method as claimed in claim 1, wherein the software change transmission includes an electronic key that operates to unlock a software component installed on the electronic product, the software component implementing a function that was unavailable before the software change transmission was received.

3. A method as claimed in claim 1, wherein, when the electronic product is powered up, the electronic device checks the flag set in memory and retrieves a software update if the flag is set.

4. A method of changing software on an electronic product having a memory, wherein the electronic product is enclosed in a packaging having a marking approximately indicating a location of a reflected power transceiver portion of the electronic product, the method comprising:
    receiving an interrogation transmission from an external transceiver at the electronic product, the electronic product being unconnected to an external power source, the interrogation transmission being received at the reflected power transceiver portion of the electronic product after being directed at the marking on the packaging of the electronic product;
    sending a reply transmission from the reflected power transmission transceiver, the reply transmission including an identification for software currently installed on the electronic product;
    after the electronic product is connected to the external power source, receiving a software change transmission by the reflected power transceiver from the external transceiver;
    storing data from the software change transmission in a memory associated with the reflected power transceiver; and
    in response to the software change transmission, setting a flag in the memory of the electronic product, the flag indicating that the software on the electronic product is out of date.

5. A method as claimed in claim 4, further comprising:
    harvesting power, by the reflected power transceiver, from the interrogation transmission for use in at least sending the reply transmission.

6. A method as claimed in claim 4, further comprising:
providing power to the electronic product from the reflected power transceiver; and
retrieving the identification for the software currently installed on the electronic product from the memory of the electronic product.

7. A method as claimed in claim 4, wherein the data from the software change transmission includes target software information and subsequent to the operation of storing the software update in the memory associated with the reflected power transceiver, the electronic product is connected to an external power source, the method further comprising:
retrieving the target software information from the memory associated with the reflected power transceiver by a processor of the electronic product; and
sending a transmission across a network, the network transmission requesting the target software.

8. A method as claimed in claim 7, further comprising:
receiving the target software at the electronic product from a network transaction sent across the network or from a satellite signal received at the electronic product.

9. A method as claimed in claim 4, wherein subsequent to the operation of storing the target software in the memory associated with the reflected power transceiver, the electronic product is connected to an external power source, the method further comprising:
retrieving the target software from a network service if the flag is set; and
installing the target software in a system memory of the electronic product.

10. A method as claimed in claim 4, wherein the data from the software change transmission includes target software, the method further comprising:
providing power to the electronic product from the reflected power transceiver; and
installing the target software in a system memory of the electronic product.

11. A method as claimed in claim 10, wherein the power provided to the electronic product is harvested from an incident electromagnetic wave received at the reflected power transceiver or is from a battery associated with the reflected power transceiver.

12. An electronic device that is delivered within removable packaging, the electronic device comprising:
an interface to an external power source;
a reflected power transceiver configured to receive an interrogation transmission from an external transceiver even when the electronic device is within the removable packaging, and to respond to the interrogation transmission even when the external power source is within the removable packaging and is not connected to the electronic device, wherein the external transceiver processes the response to the interrogation transceiver to determine whether a software update is available for the electronic device and, if the software update is available for the electronic device, the reflected power transceiver is configured to receive a subsequent response message from the external transceiver even while the electronic device is within the removable packaging, wherein the subsequent response message sets a flag in a memory without powering up the electronic device, the flag in the memory indicating that the software on the electronic device is out of date; and
a processor configured to check the memory at a later time after the electronic device is removed from the packaging and connected to the external power source, to determine that the software update is available based upon whether the flag is set, and to obtain the software update if the flag is set.

13. The electronic device of claim 12 wherein the device further comprises a network interface to a digital communications network, and wherein the processor is configured to obtain the software update from a remote service via the digital communications network.

14. The electronic device of claim 12 wherein the processor obtains the software update via the reflected power transceiver.

15. The electronic device of claim 12 wherein the processor obtains the software update from the memory.

\* \* \* \* \*